United States Patent [19]

Ishigaki

[11] 4,409,580
[45] Oct. 11, 1983

[54] SOLENOID ACTUATOR FOR ELECTROMAGNETIC VALVE

[75] Inventor: Tsuneo Ishigaki, Sugito, Japan

[73] Assignee: Shoketsu Kinzoku Kogyo Kabushiki Kaisha, Tokyo, Japan

[21] Appl. No.: 316,531

[22] Filed: Oct. 29, 1981

[30] Foreign Application Priority Data

Jan. 8, 1981 [JP] Japan ................. 56-1117[U]

[51] Int. Cl.³ .............................................. H01F 7/10
[52] U.S. Cl. ...................................... 335/243; 335/278
[58] Field of Search ............... 335/243, 278, 244, 100; 251/141

[56] References Cited

FOREIGN PATENT DOCUMENTS 2166649 12/1974 Fed. Rep. of Germany ...... 251/129
1377791 12/1974 United Kingdom ................ 335/278

Primary Examiner—Harold Broome
Attorney, Agent, or Firm—Oblon, Fisher, Spivak, McClelland & Maier

[57] ABSTRACT

A solenoid actuator for use with an electromagnetic valve which includes a magnetic frame for establishing a magnetic circuit around an energizing coil, which is formed by bending a sheet-like magnetic frame constituent plate with an eddy current eliminating slit being defined therein, thereby enabling simplification in structure of the magnetic frame, effective utilization of electric power and reduction in the magnetic resistance, and attaining inexpensive fabrication, great electromagnetic force with electrical power-saving and small magnetic loss.

4 Claims, 4 Drawing Figures

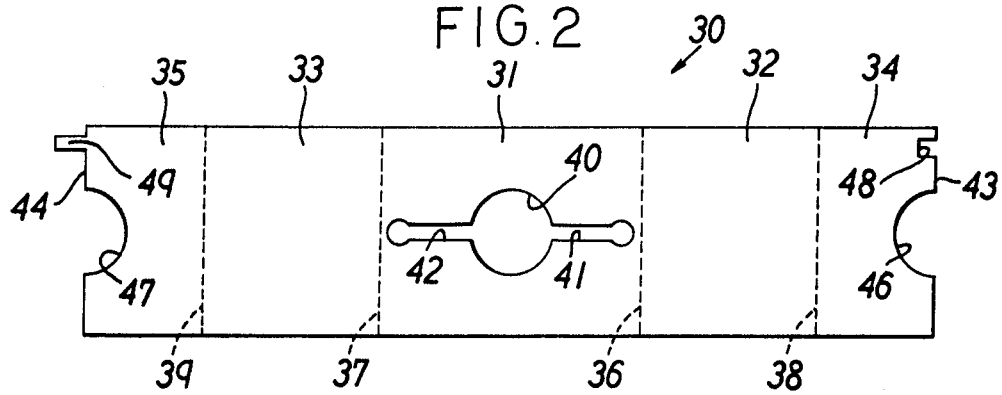
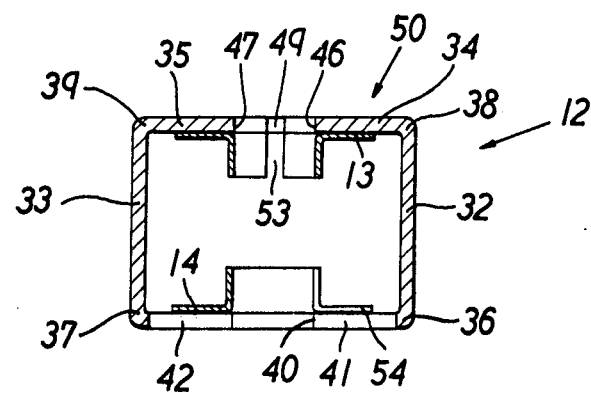
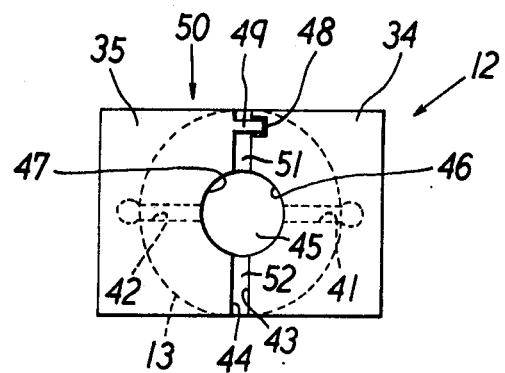

SOLENOID ACTUATOR FOR ELECTROMAGNETIC VALVE

BACKGROUND OF THE INVENTION (1) Field of the Invention

The invention is concerned with a solenoid actuator for use with electromagnetic valves.

(2) Description of the Prior Art

Magnetic frames which have hitherto been employed in general solenoid actuators for use with electromagnetic valves are structured, for instance, as a so-called cover type having a cover placed over the top of coil and a flux plate fitted therebelow, and a so-called frame type having a pair of frames abutted against the sides of coil so as to form a magnetic frame. It has, however, been recognized experimentally that good results are obtainable for the structure of such magnetic frames where they have neither gaps nor acute corners across the magnetic circuit. Thus, the cover type structure is defective in being liable to form gaps in the juncture between the cover and the flux plate due to errors resulting in the fabrication thereof or deformations caused by external forces upon mounting the coil, and leading to large magnetic resistance by the gaps. The frame type structure also has the drawbacks of requiring complicated fabrication and being high in cost.

SUMMARY OF THE INVENTION

The present invention has been accomplished in view of the foregoing defects of the solenoid actuators in the prior art and has as its principal object providing a solenoid actuator for use with electromagnetic valves capable of obtaining great electromagnetic force with electrical power-saving, in which the magnetic frame capable of defining a magnetic circuit arround an energizing coil body with neither gaps nor acute corners is formed by bending a sheet-like magnetic frame plate, to thereby attain a reduction in the magnetic resistance and a decrease in flux leakage.

It is another object of the present invention to provide a solenoid actuator for use with electromagnetic valves having a magnetic frame formed by bending a sheet-like magnetic frame plate, which can be fabricated with ease and at low cost through punching and bending in a press machine with less material loss.

It is a further object of the present invention to provide a solenoid actuator for use with electromagnetic valves capable of effectively utilizing electrical power with reduced generation of eddy current, by using the gap, as an eddy current eliminating slit, necessarily formed between the mating end edges of said magnetic frame plate when they are abutted against each other through bending.

It is a further object of the present invention to provide a solenoid actuator for use with electromagnetic valves having a magnetic frame in an adequate structure which can be formed simply and with ease enabling connection of the two mating end edges of the magnetic frame plate by the engagement between a concave connecting portion and a convex connecting portion provided respectively to the mating end edges.

It is a still further object of the present invention to provide a solenoid actuator for use with electromagnetic valves capable of effectively utilizing electrical power while further reducing generation of eddy current by forming a slit for eliminating eddy current in the end plate parts of the magnetic frame plate.

The foregoing objects can be attained according to the invention by a solenoid actuator for use with electromagnetic valves having a coil body externally surrounded with a magnetic frame and provided in the axial center thereof with a stationary core and a movable core, wherein the magnetic frame is formed by integrally bending a sheet-like magnetic frame plate substantially of a rectangular shape comprising an end plate part to be abutted against one of the end faces of the coil body, a pair of side plate parts each continuous with the respective sides on the end plate part for covering the sides of the coil and a pair of half end plate parts each continuous with the side on each of the pair of the side plate parts for covering the other of the end faces of the coil body, and wherein the mating end edges of the half end plate parts, when opposed to each other, define therebetween a slit for eliminating eddy current.

BRIEF DESCRIPTION OF THE ACCOMPANYING DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 2 is a development view for a magnetic frame plate used in the solenoid actuator shown in FIG. 1;

FIG. 3 is a vertical cross sectional view of the magnetic frame; and

FIG. 4 is a plan view of the magnetic frame.

DETAILED DESCRIPTION OF THE PREFERRED EMBODIMENT

Figure 1:
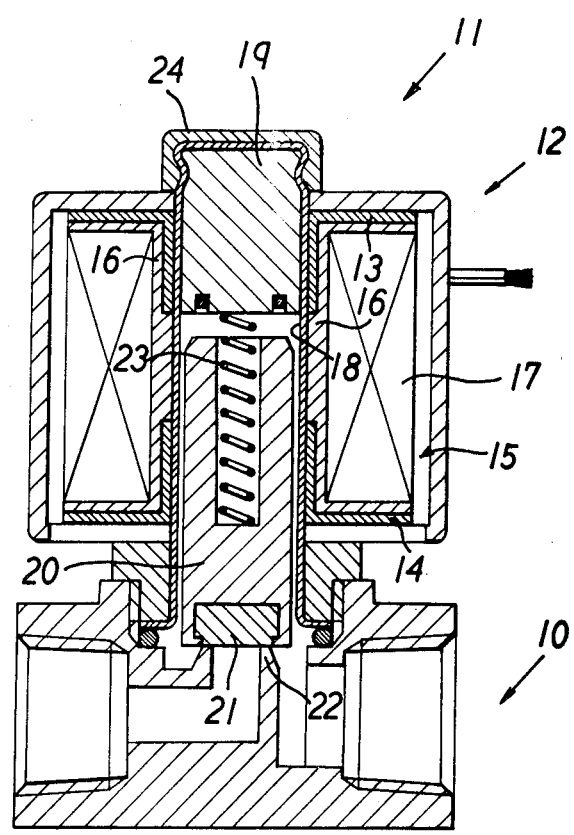
FIG. 1 is a vertical cross sectional view of an electromagnetic valve assembled with a solenoid actuator for use with electromagnetic valves according to the invention.

As shown in FIG. 1, a solenoid actuator 11 disposed above a valve body 10 comprises a magnetic frame 12, flangelike auxiliary magnetic frames 13, 14 attached to the inside of the magnetic frame 12 and an energizing coil 15 surrounded with these frames. The coil 15 comprises a coil bobbin 16 externally engaged over the auxiliary magnetic frames 13, 14 and coil windings 17 wound around the bobbin 16. At the axial center of the coil 15 is inserted a guide pipe 18 in which a stationary core 19 is fixedly engaged and a movable core 20 is axially slidably disposed therebelow. A spiral spring 23 is compressed between both of the cores 19 and 20 for resiliently urging the valve portion 21 of the movable core 20 against a valve seat 22. The exposed top of the guide pipe 18 is attached with a fixing cap 24. Upon deenergization of the coil 15, the valve portion 21 closes the valve seat 22 by the resilient force of the spring 23 and, upon energization of the coil 15, the movable core 20 is attracted to the stationary core 19 against the resilient force of the spring 23 to open the valve seat 22.

The magnetic frame 12 is formed by bending a sheet-like magnetic frame plate 30, shown in a developed state in FIG. 2, into a frame-like configuration as shown in FIG. 3 and FIG. 4. In the developed state, the magnetic frame plate 30 is substantially of a rectangular configuration comprising a series of parts successively joined, that is, an end plate part 31 to be abutted against the bottom, i.e., one of the end faces of the coil 15, a pair of side plate parts 32, 33 for covering the sides of the coil 15 being continuous with the respective sides of the end plate part 31 by way of bending lines 36, 37 respectively, and a pair of half end plate parts 34, 35 for covering the top surface, i.e., the other of the end faces of the coil 15 each being continuous with the sides on the respective side plate parts 32, 33 by way of bending lines 38, 39 respectively. The end plate part 31 is apertured at the central portion thereof with a through hole 40 for insertion of the guide pipe 18 and eddy current eliminating longitudinal slits 41, 42 each extended from the periphery of the through hole 40 to the bending lines 36, 37 on both sides. The half end plate parts 34, 35 are recessed in the mating end edges 43, 44 with semi-circular notches 46, 47, respectively, for forming a through hole 45 for insertion of the guide pipe 18, and further provided with a concave connecting portion 48 and a convex connecting portion 49, respectively.

The magnetic frame plate 30 having such a constitution is bent so as to engage the mating connecting portions 48, 49 to each other as shown in FIG. 3 and FIG. 4, whereby the two half end plate parts 34, 35 are opposed to form an end plate part 50 for covering the top face of the coil 15 while forming eddy current eliminating slits 51, 52 by the gap between the end edges 43, 44 thereof. At the same time, the notches 46, 47 are joined together to complete a through hole 45 for insertion of the guide pipe 18 while being prevented from mutual displacement by the engagement between the connecting portions 48, 49. References 53, 54 shown in FIG. 3 represent eddy current eliminating slits provided to the auxiliary magnetic frames 13, 14 respectively.

Since the magnetic frame 12 is formed by integrally bending one sheet of the magnetic frame plate 30 with the connecting portions 48, 49 being engaged to each other so that both of the end edges 43, 44 may be positively opposed to each other at the top face of the coil 15, the magnetic circuit defined by the magnetic frame 12 contains neither gaps nor acute corners, whereby the reduction in the magnetic resistance and the decrease in the magnetic flux leakages can be attained to thereby obtain a great electromagnetic force. Further, since the gap necessarily produced upon bending of the magnetic frame plate 30 can be utilized as the eddy current eliminating slits 51, 52, they, together with the eddy current eliminating slits 41, 42 apertured in the end plate part 31, suppress the generation of eddy current thus making it possible to effectively utilize the electrical power supplied to the solenoid. Further, since the magnetic frame 12 is formed as an integral part by the bending of the magnetic frame plate 30, such is simple in structure and can be fabricated with ease by way of the puncing and bending fabrication of steel in a press machine, thus leading to cost reduction. Furthermore, since the magnetic frame 12 has no discontinuous portion other than in the top plate part, excellent structural strength can be maintained.

Obviously, numerous modifications and variations of the present invention are possible in light of the above teachings. It is therefore to be understood that within the scope of the appended claims, the invention may be practiced otherwise than as specifically described herein.

What is claimed is:

1. A solenoid actuator for an electromagnetic valve, comprising:
   a coil body having at an axial center portion thereof a stationary core and a movable core; and
   a magnetic frame within which said coil is housed and which further comprises an integral one-piece bent magnetic frame plate having an end plate which abuts against a first end face of said coil body, a first and second side plate integrally extending from said end plate for covering side portions of said coil body and a first and second half end plate integrally extending from each of the side plates, respectively, for covering a second end face of said coil body, wherein mating end edge portions of each of said half end plates each include a semi-circular notch formed therein, respectively, at a center portion of said mating end edge portions to define a through hole within which said stationary core is mounted and a respective concave and convex connecting portion engageable with each other and formed at opposing portions of said mating end edge portions, said mating end edge portions of said half end plates being opposed to each other so as to form at least one slit for eliminating eddy current therebetween.

2. A solenoid actuator as set forth in claim 1, wherein said at least one slit further comprises a first and second slit extending from opposing sides of said through hole.

3. A solenoid actuator as claimed in claim 1, wherein said end plate has a through hole formed therein and a first and second longitudinal slot formed therein extending from opposing sides of said through hole in said end plate for eliminating eddy current.

4. A solenoid actuator as claimed in claim 2, wherein said end plate has a through hole formed therein and a first and second longitudinal slot formed therein extending from opposing sides of said through hole in said end plate for eliminating eddy current.

* * * * *